March 2, 1971 H. HOPPE ET AL 3,567,405
PROCESSING CRUDE POTASH SALTS USING DIRECT
CONTACT HEAT EXCHANGER
Filed Jan. 5, 1968
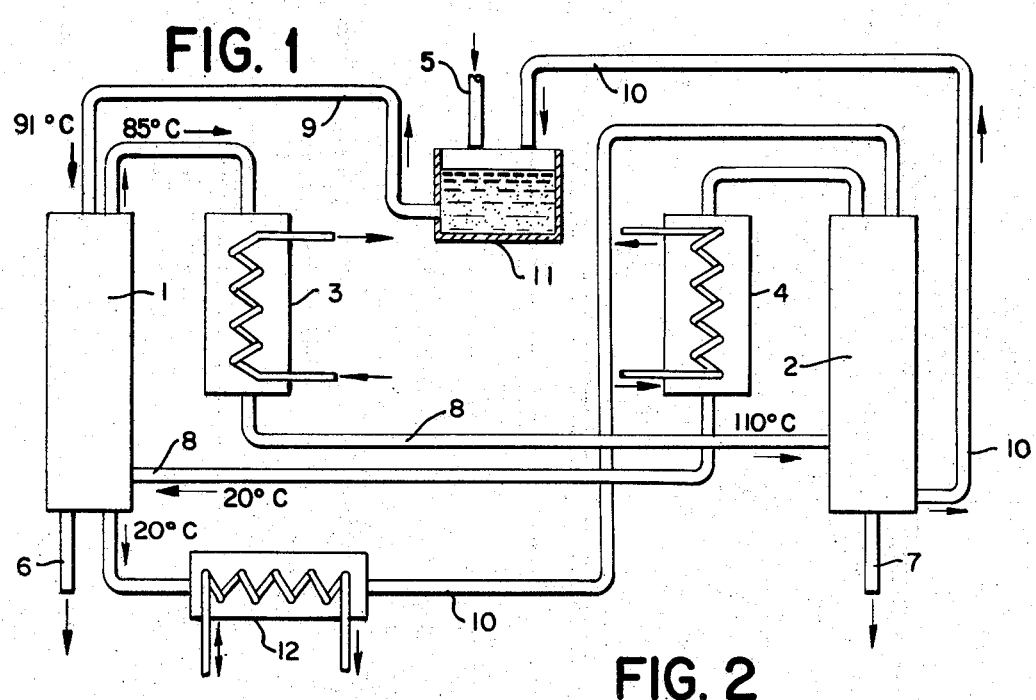
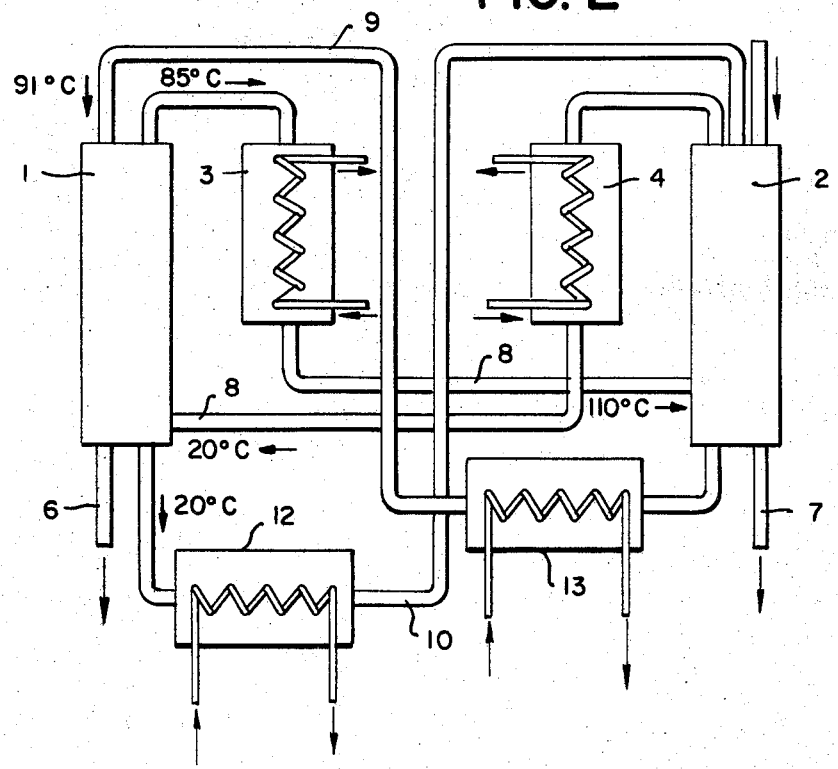
INVENTORS
HANS HOPPE
MANFRED SCHUBERT United States Patent Office 3,567,405
Patented Mar. 2, 1971

3,567,405
PROCESSING CRUDE POTASH SALTS USING
DIRECT CONTACT HEAT EXCHANGER
Hans Hoppe, Sondershausen, and Manfred Schubert,
Dresden, Germany, assignors to Kali-Forschungsinstitut, Sondershausen, Postfach, Germany
Filed Jan. 5, 1968, Ser. No. 695,920
Int. Cl. B01d 9/02; C01d 3/08
U.S. Cl. 23—299                2 Claims

ABSTRACT OF THE DISCLOSURE

Crude potash salt is treated to obtain a coarse-grained salt mixture having a higher K content, which is suitable for use as fertilizer, by directly contacting a hot solution of the soluble components of the crude salt with an inert heat transfer medium insoluble in said solution and at a lower temperature, in countercurrent flow, to cool the solution and thereby precipitate the desired salt mixture by crystallization and then directly contacting the resultant cooled residual solution with the resultant heated heat transfer medium, in countercurrent flow, to heat the residual solution for dissolution therein of an additional quantity of the crude potash salt to be processed by the same steps.

This invention relates to a method by means of which salts, particularly crude potash salts, can be manufactured into higher K content salt products suitable for use as fertilizers by dissolution of the crude salts and precipitation by crystallization from the solution of a salt mixture having a higher K content.

Since the beginning of the crude salt processing industry various methods of treatment have become known. Apart from the classical dissolving processes, mainly mechanical processing methods are used, e.g. the well-known jigging process and a number of flotation processes. To a limited degree, however, electrostatic separation has lately been used for crude salts of convenient composition.

The choice of the process technology suitable for a specific case depends in part on the crude salt to be treated and the products to be recovered from them. A great deal of the crude salts is treated by means of a dissolving process. Nowadays the dissolving process is a continuous process and it is carried out by means of the following apparatuses, named in the order in which they are employed in the process: dissolving tanks, vacuum refrigeration plants, preheaters, purging devices and devices for drying the product.

Though the application of this dissolving process is known to be disadvantageous and expensive, its use has been continued as for certain salts there is no better process technology available. The apparatuses necessary for carrying out this process require high capital expenditures. The great number of apparatuses to be used involves high expenditures for heating, great heat losses being unavoidable in spite of providing insulation for the apparatuses.

The heat losses in fertilizer production have been greatly reduced by heat recovery in vacuum refrigeration plants, partly by indirect heat exchange. The indirect heat transfer, however, involves a number of disadvantages resulting in heat losses which cannot be reduced without a fundamental alteration of the process. Moreover, the indirect heat transfer requires expensive apparatus. A further disadvantage of the process is the fact that the product obtained is in the form of very fine grains.

Already known is a method for processing potassium-containing solutions in which potassium salts are recovered by direct heat exchange with a liquid having a different, generally lower, specific gravity, especially petroleum.

In this last referred to process a potassium salt-containing hot solution is passed countercurrently to the lower density liquid through a horizontal container provided with a screw. The resultant precipitated salt is discharged by means of a bucket-elevator. The solution as well as the petroleum are recycled.

However, though this process represents, doubtless, a great advance in that it provides direct heat transfer, the expenditure for apparatus is not sufficiently decreased. Now as before the crude salt has to be introduced into a dissolver and to be dissolved, the saturated hot solution subsequently being passed to a heat exchanger. After precipitation of the salt the now unsaturated solution as well as the heat exchange liquid of lower specific gravity are to be recycled. How this recycling is to be accomplished has not been described.

According to the present invention there is provided a new process for the treatment of crude potash salt using direct heat exchange, which process avoids the above-mentioned economic disadvantages and, accordingly, is particularly economical.

More particularly, according to the invention it is found that the known processes employing dissolving tanks can be improved by introducing the hot solution leaving the dissolving tank into a multi-phase heat exchanger. In this multi-phase heat exchanger the hot saturated solution descends from top to bottom and an oil or other inert liquid heat transfer medium which is insoluble in the salt solution flows upward. This oil may be at ambient temperature or it can be cooled directly or indirectly by water or brine to lower temperatures. The salt precipitates due to crystallization and settles to the bottom of the multi-phase heat exchanger and can be drawn off continuously without the aid of mechanical conveying means. The remaining cooled solution, having a low salt concentration, is now introduced into a second multi-phase heat exchanger in which the oil, which has been heated by direct heat transfer in the first heat exchanger, is again passed upward, transferring its heat to the downwardly flowing dilute salt solution. The dilute salt solution thus having been brought approximately to solution temperature now requires only slight heating to compensate for heat losses before it can be reintroduced into the dissolver to be used for dissolving the crude salts. The salt precipitated in the first multi-phase heat exchanger is in the form of coarse grains and is of high purity.

According to another embodiment of the invention, it is possible to operate without the use of a dissolving tank as follows: the crude salt is introduced at the top of the second multi-phase heat exchanger and there, while being suspended, it is dissolved while the dilute salt solution is being heated. In this variant it can be practical to provide the multi-phase heat exchanger with a stirrer or a screw. The product obtained in the multiphase heat exchanger is subsequently dried in a known manner. In the following examples and by reference to the drawings the invention is explained in more detail.

In the drawings:

FIG. 1 is a flow diagram of the embodiment of the invention employing a dissolving tank; and FIG. 2 is a flow diagram of the embodiment which does not employ a dissolving tank.

EXAMPLE 1

Crude salt 5 and mother liquor 10 are introduced into heated dissolving tank 11 and the resultant hot solution 9 is fed from the dissolving tank 11 (FIG. 1) into a multi-phase heat exchanger 1. The solution 9 has a temperature of approximately 91° C. and the following composition:

214 g./l. potassium chloride
170 g./l. sodium chloride
66 g./l. magnesium chloride
27 g./l. magnesium sulfate
785 g./l. water The hot solution 9 is introduced at the top of the multiphase heat exchanger 1 and flows downward. Oil 8 is introduced at the bottom of the multi-phase heat exchanger 1 at ambient temperature 20° C. and, since it is less dense than the solution 9, flows upward, in a finely dispersed state, and cools the solution 9 to such a degree that at the bottom of the multi-phase heat exchanger 1 a coarse-grained product 6 precipitates having the following composition:

90% KCl (calculated as $K_2O$, 58.8%)
8.7% NaCl
0.91% $MgCl_2$
0.39% $MgSO_4$

The oil 8, heated by the solution 9 and accumulating in the upper part of the multi-phase heat exchanger 1, is drawn off continuously at the top of the heat exchanger 1, while the now less concentrated solution, designated mother liquor 10, is drawn off, also continuously, at the bottom of the heat exchanger 1 and has the following composition in addition to water:

116 g./l. KCl
178 g./l. NaCl
72 g./l. $MgCl_2$
29.5 g./l. $MgSO_4$

The mother liquor 10 leaving the heat exchanger 1 has a temperature of about 20° C. and is introduced into a second multi-phase heat exchanger 2, also at the top. Optionally, the mother liquor 10 may be pre-heated by means of a heat exchanger 12. At the same time oil 8 leaving at the top of the heat exchanger 1 at a temperature of approximately 85° C. is heated to 110° C. by means of a heat exchanger 3 and introduced at the bottom of the heat exchanger 2 in which it flows upward in a finely dispersed state transferring its heat to the mother liquor 10 which thereby attains a temperature 95° C. sufficient to dissolve crude salt 5 to form the solution 9 of the hereinabove indicated composition and is passed to the dissolving tank 11. If the heat transfer in the heat exchanger 2 does not suffice to cool the oil 8 to the ambient temperature (20° C.), it is passed through a heat exchanger 4, for that purpose, before being fed to the bottom of the heat exchanger 1. The product 6 leaving the multiphase heat exchanger 1 is passed to plane filters or centrifuges, there sprayed with water, and a great part of the NaCl contained in the product 6 is eliminated. Thereby a product of high grade (about 60% $K_2O$, calculating KCl as $K_2O$) is obtained which is dried by known methods. A residue 7, which collects at the bottom of the heat exchanger 2, is drawn off.

In this embodiment 20% or more heat is saved compared with the known vacuum cooling methods.

EXAMPLE 2

In this embodiment of the process (FIG. 2) the crude salt 5 is not dissolved in a conventional dissolving tank, as is done in Example 1, but it is passed to the heat exchanger 2 and dissolved in the mother liquor 10 at a temperature between 105° and 100° C., the mother liquor 10 being pre-heated by the heat exchanger 12. The crude salt 5 contains:

20.5% KCl
0.25% $K_2SO_4$
1.94% $MgSO_4$
1.02% $MgCl_2$
13.22% $CaSO_4$
60.74% NaCl

The remainder consists of insoluble constituents formed from silicates. In this embodiment the heat exchanger 2 is provided with an agitator (not illustrated) so that the crude salt 5, having been thoroughly pulverized by a preceding grinding operation, is intensively wetted with the mother liquor. The resulting hot solution 9, with supplementary heating, if desired, being provided by means of a heat exchanger 13, is passed to the second heat exchanger 1, there cooled to the ambient temperature (20° C.) by the oil 8 introduced at the bottom, and a product 6' is obtained of high quality as in Example 1. In all other respects the process is like that of Example 1. In this embodiment 37% or more heat is saved compared with the known vacuum cooling processes.

While the invention has been described by reference to particular preferred embodiments thereof, the scope of the invention, as defined by the appended claims, is intended to encompass not only these embodiments but also all obvious modifications thereof.

What I claim is:

1. A method of treating a crude potash salt mixture having soluble components to obtain therefrom a coarse-grained salt mixture having a higher K content, comprising pre-heating a solution of the soluble components of the crude salt, pre-heating an oil having a lower specific gravity than the salt solution, feeding into the top of a first upright multi-phase heat exchanger, while providing agitation by means of an agitator located therein, the crude salt mixture and the pre-heated solution, simultaneously feeding into the bottom of the first heat exchanger the pre-heated oil, controlling the temperatures of the incoming oil and the incoming solution in the first heat exchanger such that the temperature therein is sufficiently high to cause the crude salt to dissolve in the solution to form a more concentrated solution, withdrawing the more concentrated solution from the bottom of the first heat exchanger and pre-cooling the more concentrated solution, withdrawing the oil from the top of the first heat exchanger and cooling the oil to about ambient temperature, feeding the cooled oil into the bottom of a second upright multi-phase heat exchanger, feeding the pre-cooled more concentrated solution into the top of the second heat exchanger, controlling the temperature and the rate of introduction into the second heat exchanger of the more concentrated solution and the rate of introduction into the second heat exchanger of the oil such that the more concentrated solution is cooled to about the ambient temperature whereupon the desired coarsed grained salt mixture having a higher K content than the original crude potash salt mixture, crystallizes therefrom and the oil is heated, withdrawing the solution from the bottom of the second heat exchanger, recycling the withdrawn solution from the second heat exchanger to said pre-heating to prepare said residual solution for use as the feed solution to the first heat exchanger, withdrawing the heated oil from the top of the second heat exchanger and recycling the heated oil to the first heat exchanger to constitute the oil feed to the bottom of the first heat exchanger.

2. Method according to claim 1, in which the heated oil from the second heat exchanger is subjected to a further heating before being introduced into the bottom of the first heat exchanger.

References Cited
UNITED STATES PATENTS

| | | | |
|---|---|---|---|
| 1,547,893 | 9/1921 | Bergius | 203—100X |
| 2,161,800 | 6/1939 | Cross | 23—312X |
| 2,764,488 | 9/1956 | Slattery | 62—58X |
| 3,034,773 | 5/1962 | Legatski | 23—89X |
| 3,219,554 | 11/1965 | Woodward | 203—100X |
| 3,399,538 | 9/1968 | Sliepcevich | 62—58 |
| 3,402,025 | 9/1968 | Garrett | 23—312 |
| 3,433,603 | 3/1969 | Jeffery | 23—300 |

FOREIGN PATENTS

| | | | |
|---|---|---|---|
| 435,212 | 10/1926 | Germany | 23—312 |

WILBUR L. BASCOMB, JR., Primary Examiner

S. J. EMERY, Assistant Examiner

U.S. Cl. X.R.

23—300, 312, 89